United States Patent [19]

Rösch

[11] 4,269,287
[45] May 26, 1981

[54] MACHINE HOUSING WITH RELATIVELY THIN-WALLED STRUCTURAL MEMBER

[75] Inventor: Fritz Rösch, Schwabach, Fed. Rep. of Germany

[73] Assignee: Alcan Aluminiumwerk Nürnberg GmbH, Fed. Rep. of Germany

[21] Appl. No.: 46,011

[22] Filed: Jun. 6, 1979

[30] Foreign Application Priority Data

Nov. 8, 1978 [DE] Fed. Rep. of Germany ....... 2848503

[51] Int. Cl.$^3$ ............................................. F16F 15/02
[52] U.S. Cl. .................................. 188/1 B; 74/606 R
[58] Field of Search ............... 188/1 B, 266; 267/8 A, 267/8 R; 114/125; 293/104, 107–110; 74/606 R, 606 A

[56] References Cited

U.S. PATENT DOCUMENTS

| | | | |
|---|---|---|---|
| 3,134,585 | 5/1964 | Trask | 188/1 B X |
| 3,643,636 | 2/1972 | Miley et al. | 188/1 B X |
| 3,678,877 | 7/1972 | Csupor | 114/125 |

FOREIGN PATENT DOCUMENTS

| | | |
|---|---|---|
| 1601380 | 1/1971 | Fed. Rep. of Germany. |
| 555246 | 6/1977 | U.S.S.R. .................................. 188/1 B |

Primary Examiner—Douglas C. Butler
Attorney, Agent, or Firm—Cooper, Dunham, Clark, Griffin & Moran

[57] ABSTRACT

In a machine housing with a relatively thin-walled structural member which at least partially encloses a space containing at least a small quantity of liquid and in which vibrations are produced mechanically, pneumatically and/or hydraulically, at least one element is provided between facing wall portions of the member and/or between a wall portion of the member and a facing wall portion of an adjacent part of the housing for preventing the occurrence of unacceptably loud noise resulting from the vibrations, the element extending between the wall portions while leaving open a gap accessible to the liquid.

9 Claims, 5 Drawing Figures

MACHINE HOUSING WITH RELATIVELY THIN-WALLED STRUCTURAL MEMBER

BACKGROUND OF THE INVENTION

This invention relates to a machine housing with a structural member which at least partially encloses a space containing at least a small quantity of liquid, which has relatively thin walls, and in which vibrations are produced by mechanical, pneumatic and/or hydraulic means.

The structural members with which the present invention is concerned are members of such types as are used, e.g. in internal combustion engines, for example as cylinder head covers, gear box covers, oil pans and the like. In these members, vibrations are produced (mechanically, pneumatically and/or hydraulically, through moving machine parts), with accompanying production of loud noise. A wide diversity of measures have heretofore been employed in attempting to attenuate these noises.

One such known expedient is to construct the structural member with relatively thick walls or with individual reinforcement of the wall or walls. This requires use of increased quantities of material in the structural members, which is not only expensive but also increases the weight of the machine housing, contrary to the present-day preference for lightweight construction.

Another known expedient is to coat the structural member with insulating material, e.g. rubberlike flexible layers, to attenuate the noise. These insulating materials, however, are not only expensive but also tend to come loose over the course of time, whereupon their effectiveness in attenuating the noise is reduced.

SUMMARY OF THE INVENTION

An object of the present invention is to provide a structural member of the required type for a machine housing, whereby the occurrence of unacceptably high noises caused by vibrations can simply and dependably be prevented.

To this and other ends, in accordance with the invention at least one element is placed between facing wall portions of the structural member and/or between a wall portion of the structural member and the facing wall portion of an adjacent part of the housing, which element extends between the wall sections while leaving an opening accessible to the liquid (i.e. to the liquid contained within the space that is at least partially enclosed by the structural member).

That is to say, the present invention solves the problem of noise attenuation by the presence, between facing wall portions of the noise-radiating structural member and/or of the adjacent housing part, of at least one attenuation element which leaves space for an opening accessible to the liquid. The liquid penetrating or entering the opening has a vibration-attenuating effect in that, when the structural member makes vibrating movements, the liquid will alternately be pushed out of the opening and sucked back into it. The energy required for this decreases the vibrations and hence the creation of noises. The opening is shaped in such manner that the liquid in the opening can always form a sort of cushion, so that the structural member is prevented from rattling because of a blow on the adjoining housing part. The outline of the opening can be any desired shape. The surfaces defining the opening can be either plane parallel or labyrinthine. The element or elements can be manufactured in one piece with the structural member and/or the adjoining housing part, so that the noise attenuation measure according to the invention can be implemented at a justifiable cost expenditure. The arrangement according to the invention can be used wherever the support of the noise-radiating structural member against another portion of the housing is possible.

The attenuating liquid can consist of oil which in the case of internal-combustion engines for example is already present for lubrication or other purposes. In the case of housings for other machines, however, the liquid can also be water. The liquid need only have a viscosity sufficient to reduce the vibration energy of the vibrating structural members in the manner described.

An arrangement that is particularly simple from the manufacturing point of view, according to one embodiment of the invention, is to connect the element with a wall portion and to have it end before the facing wall portion, forming the opening.

It can also be practical, however, according to another embodient of the invention, to provide two elements that are in alignment with each other and border on each other, forming the opening.

As another feature of the invention, at least one element is made adjustable for setting or adjusting the width of the opening perpendicular to the path of the opening. Through this measure according to the invention, the width of the opening can be adjusted, depending for example on the quantity of liquid, the viscosity of the liquid, and the vibrating of the structural member on the basis of varying speed range of the moving parts of the machine. This permits a simple improvement of the noise behavior of the relevant structural member.

According to another embodiment of the subject invention, the element is made easily adjustable by having it screw into the wall section. This measure also constitutes an easy manufacturing solution.

It is found that it is advantageous if the width of the opening amounts to between about 0.02 and 1.0 mm. The width of the opening depends on the adjacent cross-sectional area of the attenuation element, the quantity of liquid, the viscosity of the liquid, and the like. If there is a large quantity of liquid, the width and position of the opening shall be selected so that an adequate amount of liquid can enter and also remain in the opening. With smaller amounts of liquid it will be appropriate to give the opening the shape of a capillary opening, so that it can independently suck in an adequate amount of liquid. However, it can also be appropriate to introduce the liquid into the opening by special measures.

For the specified opening widths it has also proved advantageous, in another exemplary embodiment of the invention, to give the portion of the element bordering on the opening a minimum area of about 20 mm$^2$. If the cross-sectional area is narrower, the opening can have a smaller width, and vice-versa.

Further features and advantages of the invention will be apparent from the detailed description hereinbelow set forth, together with the accompanying drawings.

DETAILED DESCRIPTION

Figure 1:
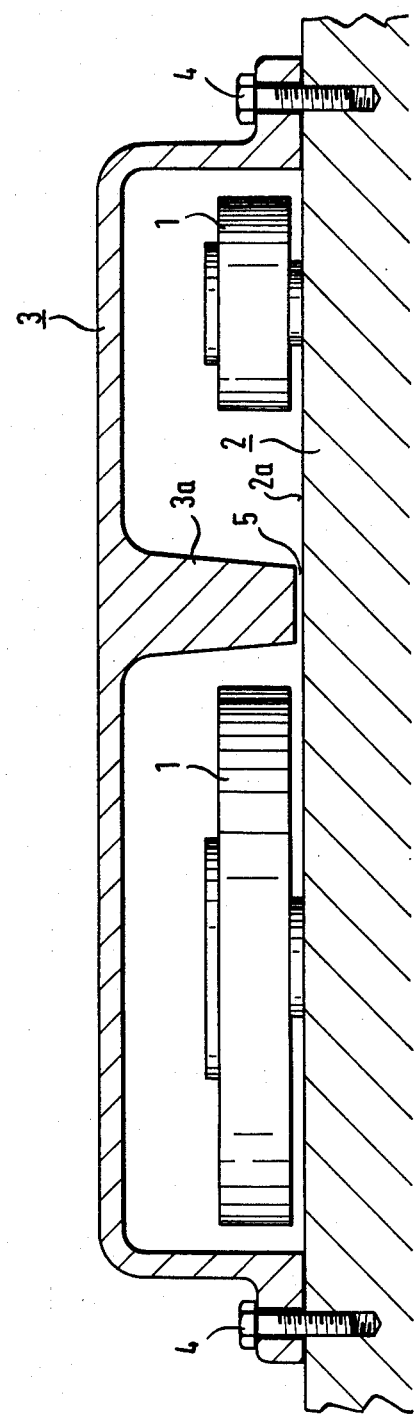
FIG. 1 is a diagrammatic depiction of a gear box cover in, for example, an internal-combustion engine, constructed according to the invention.

According to FIG. 1, gears 1 mounted on the engine block 2 of, for example, an internal-combustion engine, are covered by a gear box cover 3 which is separably connected to the engine block 2 by means of bolts 4. As is known, the gears operate partly in oil. It will be understood that the engine block 2 is a machine housing, and the gear box cover 3 is a relatively thin-walled structural member that at least partially encloses a space containing at least a small quantity of liquid (i.e. the oil for the gears). As its attenuating element, the gear box cover 3 has a bar 3a built in one piece with the inner wall of the cover; the free end of the bar 3a ends before (i.e. is spaced from) the adjoining wall 2a of the engine block 2 leaving an opening 5. This opening 5 is accessible to the oil in the gear box. If the gear box cover 3 starts to vibrate, the oil in the opening 5 acts as an attenuator, because the oil alternately must be pushed out from and then sucked back into the opening 5. Numerous experiments have shown that there is an excellent noise attenuation through the measures described.

Figure 2:
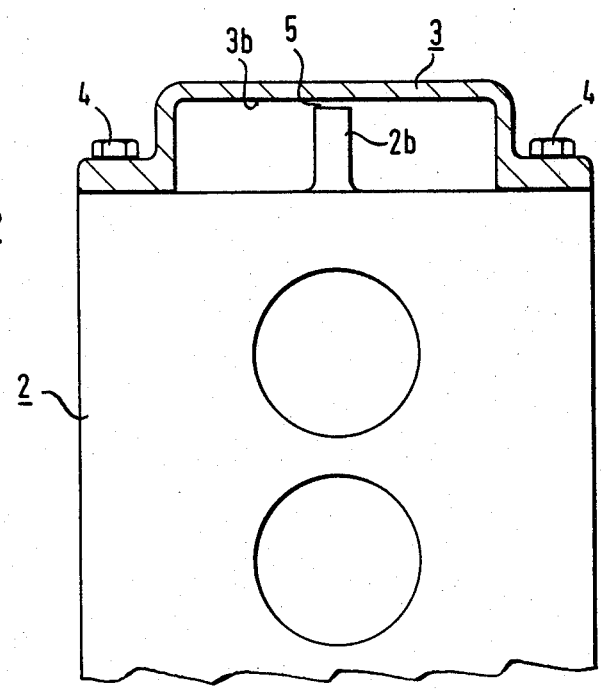
FIG. 2 is a diagrammatic depiction of another embodiment of a machine housing built according to the invention.

In the arrangement according to FIG. 2, in contrast to the arrangement of FIG. 1, the attenuation element 2b is formed on the engine block itself, and the attenuation element 2b extends almost to the relevant wall 3b of the gear box cover 3, leaving the opening 5.

In the arrangements according to FIGS. 1 and 2, the attenuation element 3a or 2b extends between an inner wall of the structural member, in this case of the gear box cover 3, and the facing wall section 2a of the adjoining housing part, namely of engine block 2. In contrast, in the construction according to FIG. 3, the structural member 3 is equipped with two attenuation elements 3c and 3d, which extend between two facing wall parts of the structural member 3, are arranged facing each other, and border on each other forming the opening 5.

Figure 4:
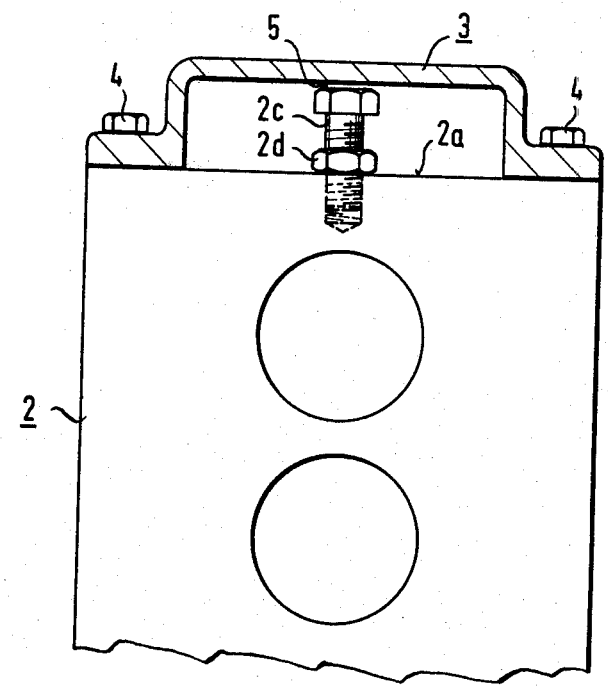
FIG. 4 is an embodiment of the invention comparable to the arrangement according to FIG. 2, but with an adjustable element.

The construction according to FIG. 4 differs from the arrangement according to FIG. 2 in that the attenuation element is formed as a bolt 2c that is screwed into a corresponding thread in the wall 2a of the engine block 2. In this way the opening 5 is formed between the appropriately finished end of the bolt 2c and the inner wall of the structural member 3. The width of the opening 5 can be adjusted by suitably adjusting the bolt 2c. The position of the bolt 2c is in each case ensured by a check nut 2d.

Figure 3:
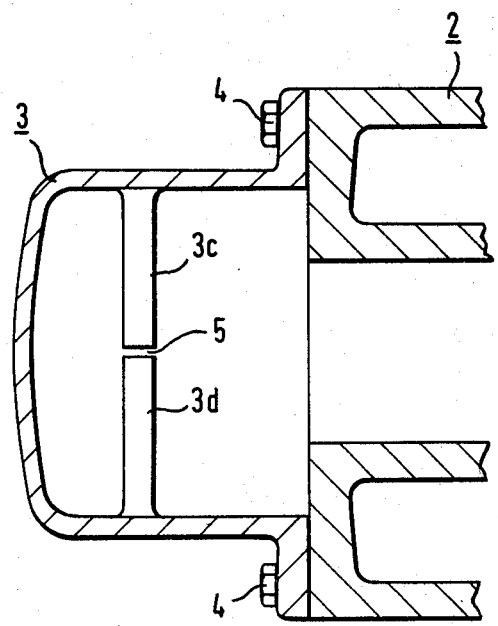
FIG. 3 is a diagrammatic depiction of another embodiment of a structural member built according to the invention.
Figure 5:
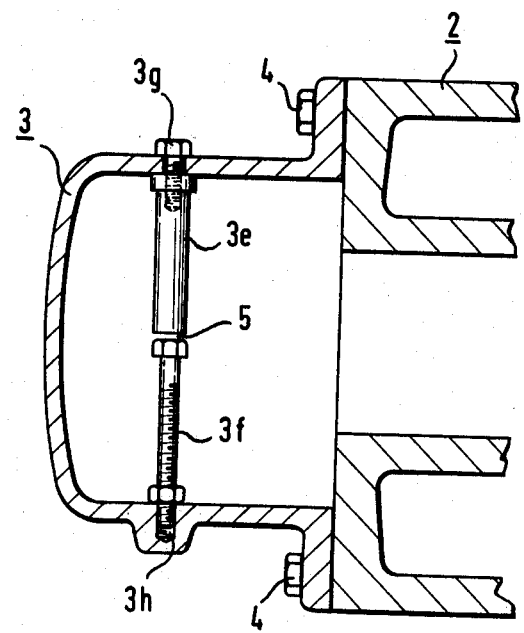
FIG. 5 is an embodiment according to the invention comparable to the arrangement according to FIG. 3, but with adjustable elements.

In the construction according to FIG. 5, the attenuation elements 3e and 3f are shaped differently from the arrangement according to FIG. 3. Here the attenuation element 3e consists of a rod or a bar that is screwed to the relevant wall portion of the structural member 3 by means of a bolt 3g. In contrast, the attenuation element 3f consists of a bolt or screw that is screwed into a pocket hole in the relevant wall section of the structural member 3. The width of the opening 5 can be adjusted by longitudinally adjusting the attenuation element 3f appropriately.

It is to be understood that the invention is not limited to the features and embodiments hereinabove specifically set forth, but may be carried out in other ways without departure from its spirit.

I claim:

1. In a machine housing with a structural member that at least partially encloses a space containing at least a small quantity of liquid, said housing and said member each having wall portions facing into said space, the wall portions of said member including at least one thin wall subject to noise-producing vibration, the improvement which comprises:
   (a) means for providing, within said space, a slit-like opening of restricted width accessible to the liquid in said space such that some of said liquid is present in said opening,
   (b) said opening being defined between first and second surfaces of which the first surface is in motion-transmitting relationship with said one thin wall such that said first surface vibrates with said one thin wall and damping of vibration of said first surface attenuates vibration of said one thin wall, the liquid present in said opening acting to damp vibration of said first surface and thereby to attenuate vibration of said one thin wall, and
   (c) said opening-providing means comprising at least one element, connected to one of said wall portions and extending toward but not connected to another of said wall portions and having a surface portion constituting one of said first and second opening-defining surfaces, one of the last-mentioned wall portions being said one thin wall.

2. A housing as defined in claim 1 wherein said slit-like opening has a linear axis and further comprising means for positionally adjusting said one element in a direction perpendicular to said axis of the opening for adjusting the width of the opening.

3. A housing as defined in claim 2, wherein said adjusting means comprises means by which said one element is adjustably screwed into a wall portion.

4. A housing as defined in claim 1, wherein the width of said opening is in a range between about 0.02 mm. and about 1.00 mm.

5. A housing as defined in claim 1 wherein the area of the surface portion of said one element is at least about 20 mm$^2$.

6. A housing as defined in claim 1, wherein said one element is connected to said one thin wall and said first surface is said surface portion of said one element.

7. A housing as defined in claim 1, wherein said element extends toward but is not connected to said one thin wall and wherein said first surface is a surface of said one thin wall.

8. A housing as defined in claim 1, wherein said opening-providing means further includes a second element connected to the other of said last-mentioned wall portions and having a surface portion constituting the other of the opening-defining surfaces.

9. A housing as defined in claim 1, wherein said one element is positionally adjustable relative to the wall portion to which it is connected in a direction for varying the width of said opening.

* * * * *